United States Patent [19]

Zeller et al.

[11] Patent Number: 4,660,500
[45] Date of Patent: Apr. 28, 1987

[54] STEERING WHEEL INSTALLATION ALIGNMENT DEVICE

[75] Inventors: Gregor Zeller, Aschaffenburg; Helmut Bonn, Haibach, both of Fed. Rep. of Germany

[73] Assignee: Petri AG, Fed. Rep. of Germany

[21] Appl. No.: 842,833

[22] Filed: Mar. 24, 1986

[30] Foreign Application Priority Data

Mar. 23, 1985 [EP] European Pat. Off. ........ 85103485.0

[51] Int. Cl.[4] ...................... H01R 35/00; B60R 21/08
[52] U.S. Cl. .................................... 116/31; 340/52 R; 200/61.54; 403/1
[58] Field of Search .............. 340/52 R; 116/31, 284, 116/294, DIG. 21; 180/255, 79, 131; 74/484 R, 552; 280/771, 775; 200/61.54, 61.55; 29/464, 407; 403/1, 13, 14, 27

[56] References Cited

U.S. PATENT DOCUMENTS 3,949,702 4/1976 DeLong ................... 116/DIG. 21
4,419,831 12/1983 Zimmer ................... 116/DIG. 21

Primary Examiner—James L. Rowland
Assistant Examiner—T. Rittmaster
Attorney, Agent, or Firm—Robert J. Koch

[57] ABSTRACT

Steering wheel with an electric cable to a protective gas bag impact device located in the bowl of the steering wheel of an automotive vehicle, having a conductor formed of several concentric windings of a conducting strip arranged in a housing surrounding the steering wheel spindle and hub. One end thereof terminates in a core fastened to the steering wheel hub and rotates therewith, while the other end terminates in a fixedly mounted housing. A spring-loaded two arm rocker with arms at an angle to each other, is mounted on the hub or spindle. One arm of which projects into the path of a nut securing the steering wheel on the spindle. A recess located in the hub within the pivoting range of said arm and a recess located in the housing within the pivoting range of the other arm. The spring is loading the rocker in a rotating direction against the housing.

6 Claims, 2 Drawing Figures

STEERING WHEEL INSTALLATION ALIGNMENT DEVICE

This application is related to EP No. 85 102034.4 corresponding to U.S. application Ser. No. 835,282, EP No. 85 103482.7 corresponding to U.S. application Ser. No. 842,948, and to EP No. 103484.3 corresponding to U.S. application Ser. No. 842,949. The disclosures of all of the above documents are expressly incorporated by reference herein. Application EP No. 103483.5 and corresponding U.S. application Ser. No. 842,947 is also related to the instant application.

BACKGROUND OF THE INVENTION

1. Field of the Invention

The invention relates to a steering wheel with an electric cable to a protective gas bag impact device located in the bowl of the steering wheel of an automotive vehicle, more particularly a steering wheel having a current conductor formed essentially by a conducting strip or ribbon cable arranged in several concentric windings in a housing surrounding the steering spindle or steering wheel hub, a first end of said strip ending in a core fastened to the steering wheel hub and rotating with the steering wheel, a second end may terminate in a fixedly mounted housing.

2. Description of the Related Art

Conducting connectors as those shown in DE-OS No. 30 09 109.9 perform well in actual operation, but difficulties are experienced occasionally due to the incorrect or malaligned installation of the current connector which is premounted on the steering wheel. The current cable must be mounted while the steering wheel is in its center position and vehicle wheels are set for straight line travel; a helical strip of sufficient length for approximately six turns in order to accomodate the usual maximum deflection of steering wheels is required. If the housing is rotated unintentionally in relation to the core prior to the installation, the maximum rotating angle of the steering wheel is unilaterally shorted or limited, thereby leading to potential accidents or breaking the connector, resulting in inactivation of the protective gas bag device. It is necessary to carefully test the position of the helical strip and its accurate setting in the centered position in each case. Even with an expenditure of a substantial amount of labor for inspection, the omission of the test and incorrect adjustments by an installer cannot always be prevented.

SUMMARY OF THE INVENTION

It is an object of the present invention to provide a steering wheel with a conductor of the above-described type, where the risk of incorrect installation is reduced both during the initial installation and subsequent installation following dismantling for maintenance. A conductor and connector for a steering wheel are described in EP No. 85 102304.4, corresponding to U.S. patent application Ser. No. 835,282, the disclosure of which is expressly incorporated herein. The invention includes a spring-loaded two arm rocker with angled arms arranged on the steering wheel hub or spindle. One arm protrudes into the path of a nut securing the steering wheel on the spindle. A recess is located in the hub within the pivoting range of said arm and a second recess is located in the housing within the pivoting range of the other arm. The spring loads or forces the rocker in a direction against the housing.

The invention includes a steering wheel with a connector cable whereby incorrect mounting is practically prevented setting and securing the housing its correct center position in relation to the core or the hub of the steering wheel. The rocker arm locking mechanism may only be released by the installation process itself, so that any unintentional rotation of the housing with respect to the hub or the core mounted thereon is prevented.

BRIEF DESCRIPTION OF THE DRAWINGS

The invention is made apparent by an example with reference to the drawing. In the drawing.

DETAILED DESCRIPTION OF THE PREFERRED EMBODIMENT

Figure 1:
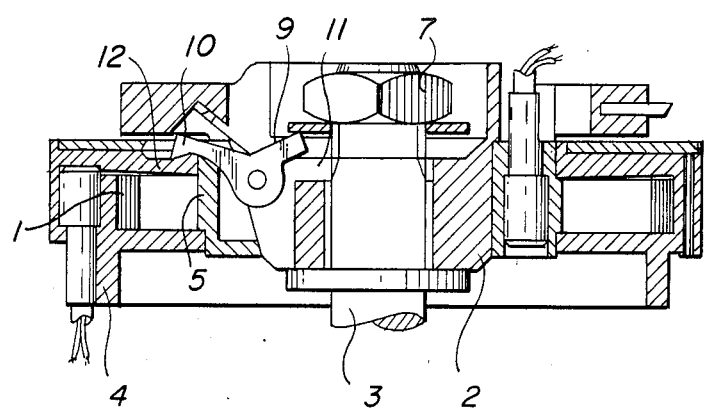
FIG. 1 shows a section through a steering wheel hub with a current cable conductor according to the invention.
Figure 2:
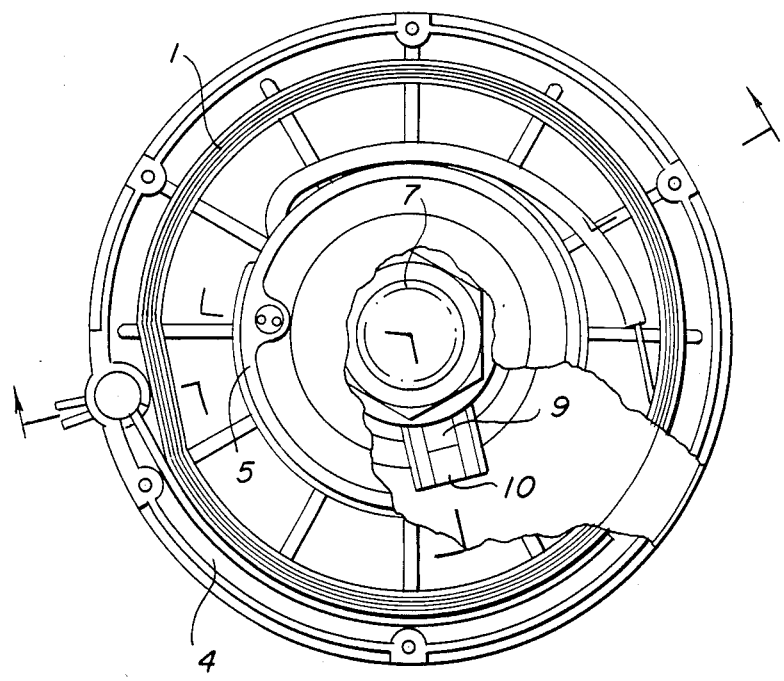
FIG. 2 shows a partially sectioned view of FIG. 1.

The steering wheel shown in the drawing has an electric cable to a protective gas bag impact device located in the bowl of a vehicle steering wheel. The conductor 1 is shown as a conducting strip or ribbon cable arranged with several concentric windings or loops within a housing 4 surrounding a steering wheel hub 2 or the steering wheel spindle 3. One end of the strip terminates in a core 5 fastened to the steering wheel hub 2. The core 5 rotates with said steering wheel. The other end terminates in the fixedly mounted housing 4. The steering wheel is secured on the steering spindle 3 by a nut 7. A spring-loaded two arm rocker with arms 9, 10 at an angle to each other, is arranged on the hub 2. One arm 9 projects into the path of the nut 7 securing the steering wheel on the spindle 3. A recess 11 is provided in hub 2 within the pivoting range of said arm 9 and a recess 12 is provided in the housing 4 within the pivoting range of the other arm 10. A spring loads or forces the rocker 9, 10 in a rotating direction against the housing 4.

During assembly of the steering wheel, the core 5 is fixedly mounted on the hub 2 and the installation secured after setting the housing 4 in the center position of the conducting strip 1, so that the rocker arm 10 is locked in the recess 12. The wheels are then set for straight line travel and the steering wheel installed by placing hub 2 onto the spindle 3 and subsequently fastening it with the nut 7. In the process the rocker arm 9 is moved until it enters the recess 11, whereby the rocker arm 10 is pivoted out of the recess 12. The core 5 together with the steering wheel then may be rotated in relation to the fixed housing to the necessary and possible extent without interfering with the path of rotation or breaking the conductor. When being dismantled or reinstalled following the straightening of the wheels the current conductor is automatically aligned and secured in its center position in a corresponding manner.

We claim:

1. A steering wheel assembly comprising:
a fixed housing member;
a rotating unit arranged within said fixed housing including a steering hub and a centrally arranged steering spindle;
a rocker arm mounted on said rotating unit with a first arm and a second arm;

said first arm projects into a path of a steering spindle nut;

said second arm is arranged to engage a first recess in said fixed housing when said steering hub is in a predetermined installation alignment;

wherein said rotating unit exhibits second and third recesses for receiving said first and second arms when pivoted to a disengaged position.

2. A steering wheel assembly according to claim 1, further comprising means for spring biasing said rocker arm to a position engaging said first recess.

3. A steering wheel assembly according to claim 2, wherein said rocker arm is mounted on said steering hub.

4. A steering wheel assembly according to claim 2, wherein said rocker arm is mounted on said steering spindle.

5. A steering wheel assembly according to claim 3, further comprising means for electrical conduction arranged in a plurality of windings in an area between said fixed housing and said rotating unit and exhibiting an outer terminal end mounted on said fixed housing and an inner terminal end mounted on and rotating with said rotating unit.

6. A steering wheel assembly according to claim 4, further comprising means for electrical conduction arranged in a plurality of windings in an area between said fixed housing and said rotating unit and exhibiting an outer terminal end mounted on said fixed housing and an inner terminal end mounted on and rotating with said rotating unit.

* * * * *